United States Patent
Sweet et al.

(10) Patent No.: US 10,129,417 B2
(45) Date of Patent: Nov. 13, 2018

(54) AD HOC TRANSMISSION OF SCANNED DOCUMENTS TO COMPUTING DEVICES

(75) Inventors: Michael R. Sweet, Morgan Hill, CA (US); Ryan W. Palumbo, San Francisco, CA (US); Steve Swen, Cupertino, CA (US); Richard Blanchard, Jr., Sonoma, CA (US); Baskaran Subramaniam, San Jose, CA (US); Howard A. Miller, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 298 days.

(21) Appl. No.: 13/364,224

(22) Filed: Feb. 1, 2012

(65) Prior Publication Data

US 2013/0194624 A1    Aug. 1, 2013

(51) Int. Cl.
*G06F 15/00*    (2006.01)
*H04N 1/00*    (2006.01)

(52) U.S. Cl.
CPC . *H04N 1/00225* (2013.01); *H04N 2201/0036* (2013.01); *H04N 2201/0039* (2013.01)

(58) Field of Classification Search
CPC ....... H04N 1/00225; H04N 2201/0039; H04N 2201/0036
USPC ......................................................... 358/1.15
See application file for complete search history.

(56) References Cited

U.S. PATENT DOCUMENTS

| | | | | |
|---|---|---|---|---|
| 2007/0274233 A1* | 11/2007 | Ptashek | ................... | H04L 67/16 370/254 |
| 2008/0079985 A1* | 4/2008 | Ferlitsch | ............ | H04N 1/00222 358/1.15 |
| 2010/0005136 A1* | 1/2010 | Ferlitsch | ........... | G06F 17/30876 709/203 |
| 2011/0299125 A1* | 12/2011 | King | .................. | H04N 1/00244 358/1.15 |
| 2012/0195387 A1* | 8/2012 | Masuda | .............. | H04M 1/7253 375/259 |
| 2013/0050741 A1* | 2/2013 | Raja et al. | ................... | 358/1.15 |

* cited by examiner

*Primary Examiner* — Neil R McLean
*Assistant Examiner* — Darryl V Dottin
(74) *Attorney, Agent, or Firm* — Blank Rome LLP

(57) ABSTRACT

The disclosed embodiments provide a system that performs document scanning. The system includes a scanner and a computing device. To enable detection of the computing device in proximity to the scanner, the computing device may be configured to advertise a scan-receiving capability using a discovery protocol. Next, the scanner may use the discovery protocol to identify a set of computing devices in proximity to the scanner, including the computing device. The scanner may then provide the set of computing devices to a user of the scanner and obtain, from the user of the scanner, a selection of the computing device as a recipient of the scanned document. Finally, the scanner may send the scanned document to the computing device over a network connection with the computing device.

15 Claims, 5 Drawing Sheets

AD HOC TRANSMISSION OF SCANNED DOCUMENTS TO COMPUTING DEVICES

BACKGROUND

Field

The disclosed embodiments relate to document scanning more specifically, the disclosed embodiments relate to techniques for ad hoc transmission of scanned documents from scanners to computing devices.

Related Art

Document scanning typically requires a series of manual steps and/or user input. For example, a user may scan a document by connecting his/her computer system to a scanner, placing the document in the scanner, selecting an option to initiating a scan from the computer system, and receiving a scanned document from the scanner on the computer system. As a result, the user may find document scanning to be a time-consuming, complicated, and/or tedious process.

Alternatively, a user may perform document scanning within an Information Technology (IT) infrastructure by providing an email address and/or File Transfer Protocol (FTP) server to a multifunction printer performing the scanning After the document is scanned, the multifunction printer may interface with a directory service to determine the network resource corresponding to the email address and/or FTP server. Once the network resource is located, the multifunction printer may transmit the scanned document to the network resource. Such network-based transmission of scanned documents may simplify receipt of the scanned documents but may not be available to organizations and/or individuals that do not have access to such IT infrastructures.

Hence, what is needed is a mechanism for facilitating the transmission of scanned documents to recipients in the absence of a managed IT infrastructure.

SUMMARY

The disclosed embodiments provide a system that performs document scanning. The system includes a scanner and a computing device. To enable detection of the computing device in proximity to the scanner, the computing device may be configured to advertise a scan-receiving capability using a discovery protocol. Next, the scanner may use the discovery protocol to identify a set of computing devices in proximity to the scanner, including the computing device. The scanner may then provide the set of computing devices to a user of the scanner and obtain, from the user of the scanner, a selection of the computing device as a recipient of the scanned document. Finally, the scanner may send the scanned document to the computing device over a network connection with the computing device.

In some embodiments, the computing device also enables use of the scanned document by a user of the computing device. For example, the computing device may open the scanned document in a default application, save the scanned document, and/or forward the scanned document to a cloud-storage service and/or one or more other computing devices. Alternatively, if no default action is available for processing of the scanned document on the computing device, the computing device may query the user of the computing device for an action associated with the document.

In some embodiments, the computing device also obtains, from the user of the computing device, approval to enable communication with the scanner prior to enabling the detection of the computing device in proximity to the scanner.

In some embodiments, the computing device also provides, to the user of the computing device, a request to transmit the scanned document from the scanner to the computing device. The computing device may then enable use of the scanned document by the user of the computing device if the request is approved by the user of the computing device.

In some embodiments, the request includes a query for an identifier associated with the computing device. For example, the computing device may ask the user of the computing device for a PIN and/or password to validate the user as a recipient of the scanned document. If the user of the computing device provides the same identifier as an identifier obtained from the user of the scanner during selection of the computing device as the recipient of the scanned document, access to the scanned document by the user of the computing device may be enabled.

In some embodiments, the network connection includes a Wi-Fi connection.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for performing document scanning. The document scanning may be performed by a scanner and/or multifunction printer with networking capabilities. Scanned documents from the scanner and/or multifunction printer may then be sent to a computing device such as a personal computer, laptop computer, tablet computer, mobile phone, portable media player, and/or another electronic device with networking capabilities.

Figure 1:
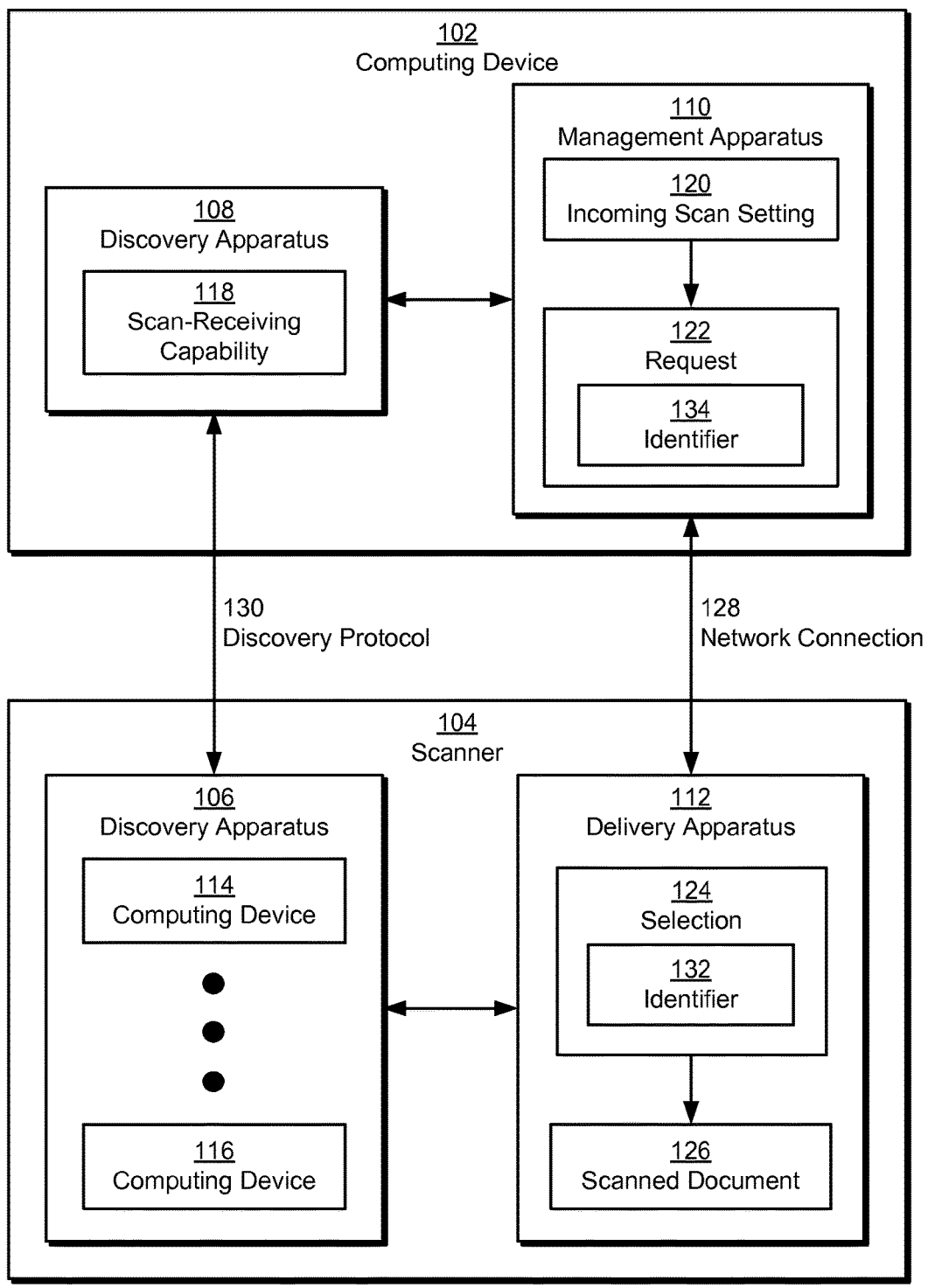
FIG. 1 shows a schematic of a system in accordance with the disclosed embodiments.

More specifically, the disclosed embodiments provide a method and system for ad hoc transmission of scanned documents to computing devices. As shown in FIG. 1, a scanner 104 may be used to produce a scanned document 126 that is sent to a computing device 102. For example, a user of computing device 102 may place a document to be scanned in scanner 104, connect computing device 102 to scanner 104 using one or more cables, initiate the scan from computing device 102, and receive scanned document 126 over the cable(s) on computing device 102. As a result, document scanning between computing device 102 and scanner 104 may require a series of manual steps and/or user input, which may be tedious and/or time consuming to the user.

Alternatively, if computing device 102 and scanner 104 are part of an Information Technology (IT) infrastructure, the user may provide an email address and/or File Transfer Protocol (FTP) server to scanner 104. Scanner 104 may perform the scan and send scanned document 126 through the IT infrastructure to the provided email address and/or FTP server. The user may then retrieve scanned document 126 by using computing device 102 to access the email address and/or FTP server. The IT infrastructure may thus simplify document scanning for users but may not be widely available. For example, the IT infrastructure may be found in a large organization but not in a small business and/or a home.

In one or more embodiments, the system of FIG. 1 includes functionality to simplify and/or streamline document scanning for the user of computing device 102 without requiring the use of an IT infrastructure to coordinate transmission of scanned document 126 from scanner 104 to computing device 102. First, a discovery apparatus 108 in computing device 102 may enable detection of computing device 102 in proximity to scanner 104 by advertising a scan-receiving capability 118 using a discovery protocol 130 such as Bonjour (Bonjour™ is a registered trademark of Apple Inc.). For example, discovery apparatus 108 may advertise scan-receiving capability 118 as a service on Bonjour.

Scan-receiving capability 118 may be enabled and disabled based on an incoming scan setting 120 provided by the user of computing device 102. For example, a management apparatus 110 (e.g., operating system, application, etc.) on computing device 102 may query the user for approval to enable communication with scanner 104 (e.g., through discovery protocol 130). If the user's approval is obtained, management apparatus 110 may set incoming scan setting 120 to "enabled" and configure discovery apparatus 108 to advertise scan-receiving capability 118. If the user's approval is not obtained, management apparatus 110 may set incoming scan setting 120 to "disabled" and prevent discovery apparatus 108 from advertising scan-receiving capability 118 on discovery protocol 130, thus "hiding" computing device 102 from nearby scanners such as scanner 104.

Once scan-receiving capability 118 is enabled, a corresponding discovery apparatus 106 on scanner 104 may discover (e.g., detect) a set of nearby computing devices 114-116 providing scan-receiving capability 118, including computing device 102. Next, a delivery apparatus 112 on scanner 104 may provide the detected computing devices 114-116 to a user of scanner 104, which may or may not be the same user as that of computing device 102. For example, the user of scanner 104 may correspond to the user of computing device 102, a user performing document scanning on behalf of the user of computing device 102, and/or a user performing document scanning independently of the user of computing device 102. Delivery apparatus 112 may then obtain a selection 124 of computing device 102 and/or one or more other computing devices from computing devices 114-116 as the recipient(s) of scanned document 126 from the user of scanner 104.

Once scanned document 126 has been generated by scanner 104, management apparatus 110 may provide, to the user of computing device 102, a request 122 to transmit scanned document 126 from scanner 104 to computing device 102. Request 122 may be generated by scanner 104 and sent to management apparatus 110 over a network connection 128 (e.g., WiFi connection, Ethernet connection, etc.) with scanner 104. Alternatively, request 122 may be generated by management apparatus 110 upon receiving scanned document 126 over network connection 128 from scanner 104.

Subsequent use of scanned document 126 by the user of computing device 102 may be based on the user's approval or denial of request 122. For example, management apparatus 110 may provide request 122 using a pop-up on a graphical user interface (GUI) of computing device 102. The pop-up may provide a name, description, and/or other information related to scanner 104, the user of scanner 104, and/or scanned document 126. The pop-up may also query the user for approval to receive scanned document 126 from scanner 104. The user of computing device 102 may then approve or deny request 122 by selecting the appropriate button and/or other GUI element within the pop-up.

If request 122 is not approved by the user, management apparatus 110 may prevent and/or block the transmission of scanned document 126 from scanner 104 to computing device 102 or discard scanned document 126 if scanned document 126 has already been transmitted to computing device 102. If request 122 is approved by the user, management apparatus 110 may enable use of scanned document 126 by the user. For example, management apparatus 110 may obtain scanned document 126 from scanner 104 over network connection 128 if scanned document 126 has not already been received by computing device 102 from scanner 104. Management apparatus 110 may then open scanned document 126 in a default application on computing device 102, save scanned document 126 on computing device 102, forward scanned document 126 from computing device 102 to a cloud-storage service associated with the user and/or other computing devices, and/or query the user for an action associated with scanned document 126. Use of scanned documents by users of computing devices is discussed in further detail below with respect to FIG. 2.

In one or more embodiments, the system of FIG. 1 includes functionality to maintain the confidentiality of scanned document 126 and/or the privacy of the user of computing device 102. As mentioned above, the user of computing device 102 may use incoming scan setting 120 to enable or disable the capability (e.g., scan-receiving capability 118) of computing device 102 to receive scans from scanner 104. To maintain a high level of privacy on computing device 102, the user of computing device 102 may toggle incoming scan setting 120 to the "disabled" state, thus preventing the ad hoc detection of computing device 102 by scanner 104 and/or other scanners using discovery protocol 130. On the other hand, the user of computing device 102 may moderate the level of privacy on computing device 102 by toggling incoming scan setting 120 to the "enabled" state. The user may then selectively approve requests (e.g., request 122) associated with incoming scanned documents, thus streamlining the receipt of scanned documents (e.g., scanned document 126) from trusted sources and/or users and blocking the receipt of scanned documents from unknown sources and/or users.

To further maintain data confidentiality and/or user privacy, computing device 102 and scanner 104 may use a set of identifiers 132-134 to validate transmission of scanned document 126 from scanner 104 to computing device 102. First, delivery apparatus 132 may obtain identifier 132 during selection 124 of computing device 102 as a recipient of scanned document 126. For example, delivery apparatus 132 may query the user of scanner 104 for a personal identification number (PIN), password, and/or other alphanumeric input to be used in protecting scanned document 126. Next, management apparatus 110 may obtain identifier 134 within request 122 by querying the user of computing device 102 for the same PIN, password, and/or alphanumeric input provided to delivery apparatus 112. Transmission of scanned document 126 from scanner 104 to computing device 102 may then be enabled if identifiers 132-134 match and disabled if identifiers 132-134 do not match.

By enabling the ad hoc transmission of scanned documents (e.g., scanned document 126) from scanners (e.g., scanner 104) to nearby computing devices (e.g., computing device 102), the system of FIG. 1 may simplify document scanning without requiring the use of an IT infrastructure to transmit the scanned documents among the scanners and/or computing devices. In addition, the system of FIG. 1 may prevent unwanted and/or unauthorized transmissions of the scanned documents by allowing the "hiding" of the computing devices from the scanners, the acceptance or rejection of individual scanned documents from the scanners on the computing devices, and/or the validated transmission of the scanned documents from the scanners to the computing devices.

Figure 2:
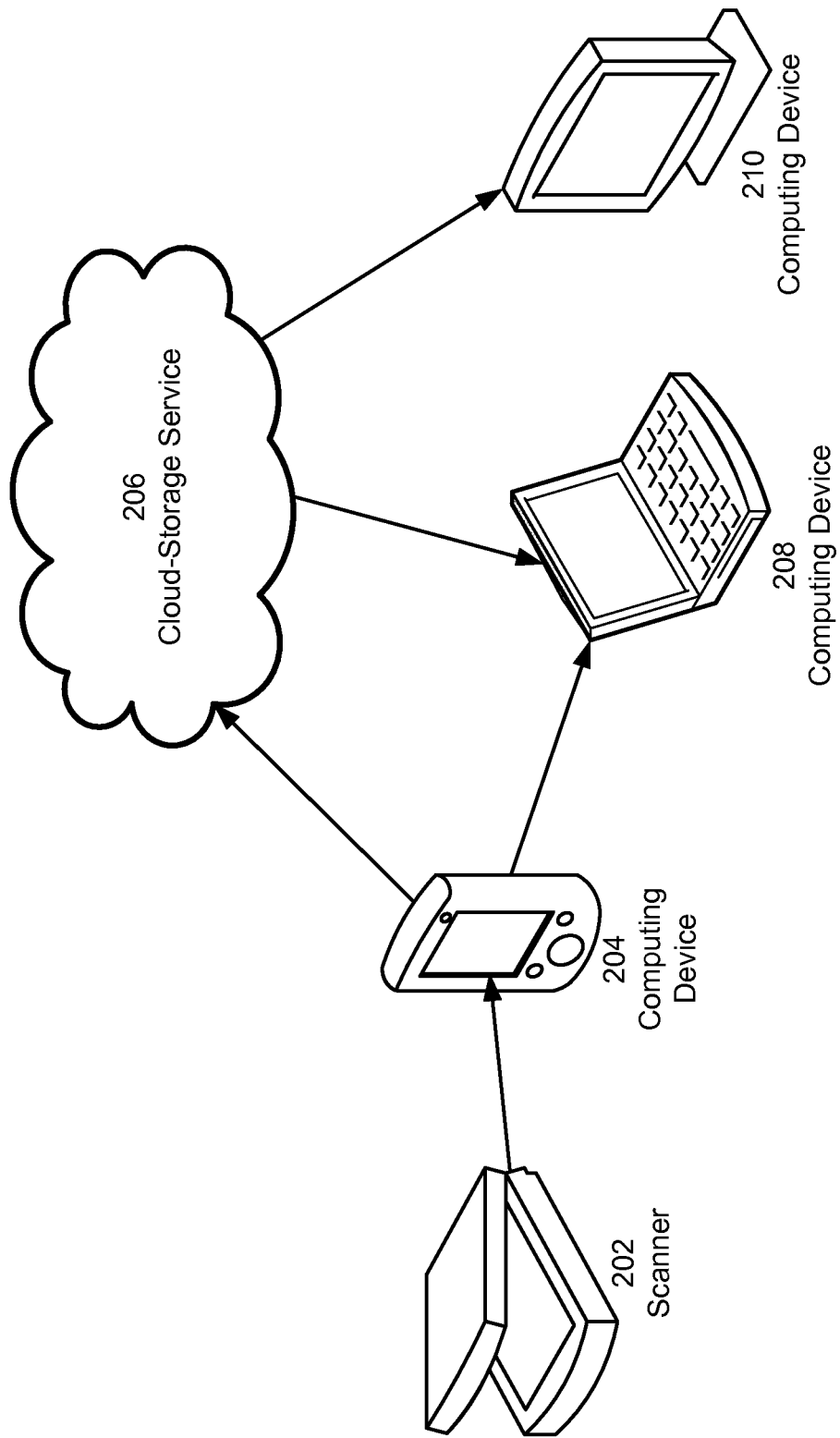
FIG. 2 shows the exemplary transmission of a scanned document from a scanner in accordance with the disclosed embodiments.

FIG. 2 shows the exemplary transmission of a scanned document from a scanner 202 in accordance with the disclosed embodiments. As shown in FIG. 2, the scanned document may be created on scanner 202. For example, the scanned document may correspond to a digital representation of a document loaded into scanner 202. The scanned document may then be sent to a computing device 204 in proximity to scanner 202, such as a mobile phone or tablet computer. As discussed above, the scanned document may be transmitted in an ad hoc fashion, in which scanner 202 detects computing device 204 using a discovery protocol (e.g., discovery protocol 130 of FIG. 1) and sends scanned document to computing device 204 without requiring the use of a physical connection and/or IT infrastructure between scanner 202 and computing device 204.

Once the scanned document is received by computing device 204, use of the scanned document by a user of computing device 204 is enabled. For example, the scanned document may be opened in a default application on computing device 204 and/or saved on computing device 204. Alternatively, if no default application and/or action exist for handling incoming scans on computing device 204, the user may be queried for an action associated with the scanned document. For example, the user may be asked to provide a directory to which the scanned document should be saved and/or an application under which the scanned document should be opened.

The scanned document may also be forwarded from computing device 204 to a cloud-storage service 206 associated with the user and/or one or more other computing devices 208-210. For example, the scanned document may automatically be sent from computing device 204 to cloud-storage service 206 to create a backup of the scanned document on cloud-storage service 206. The scanned document may then be sent from computing device 204 and/or cloud-storage service 206 to computing devices 208-210 such as personal and/or laptop computers for further processing and use of the scanned document.

Figure 3:
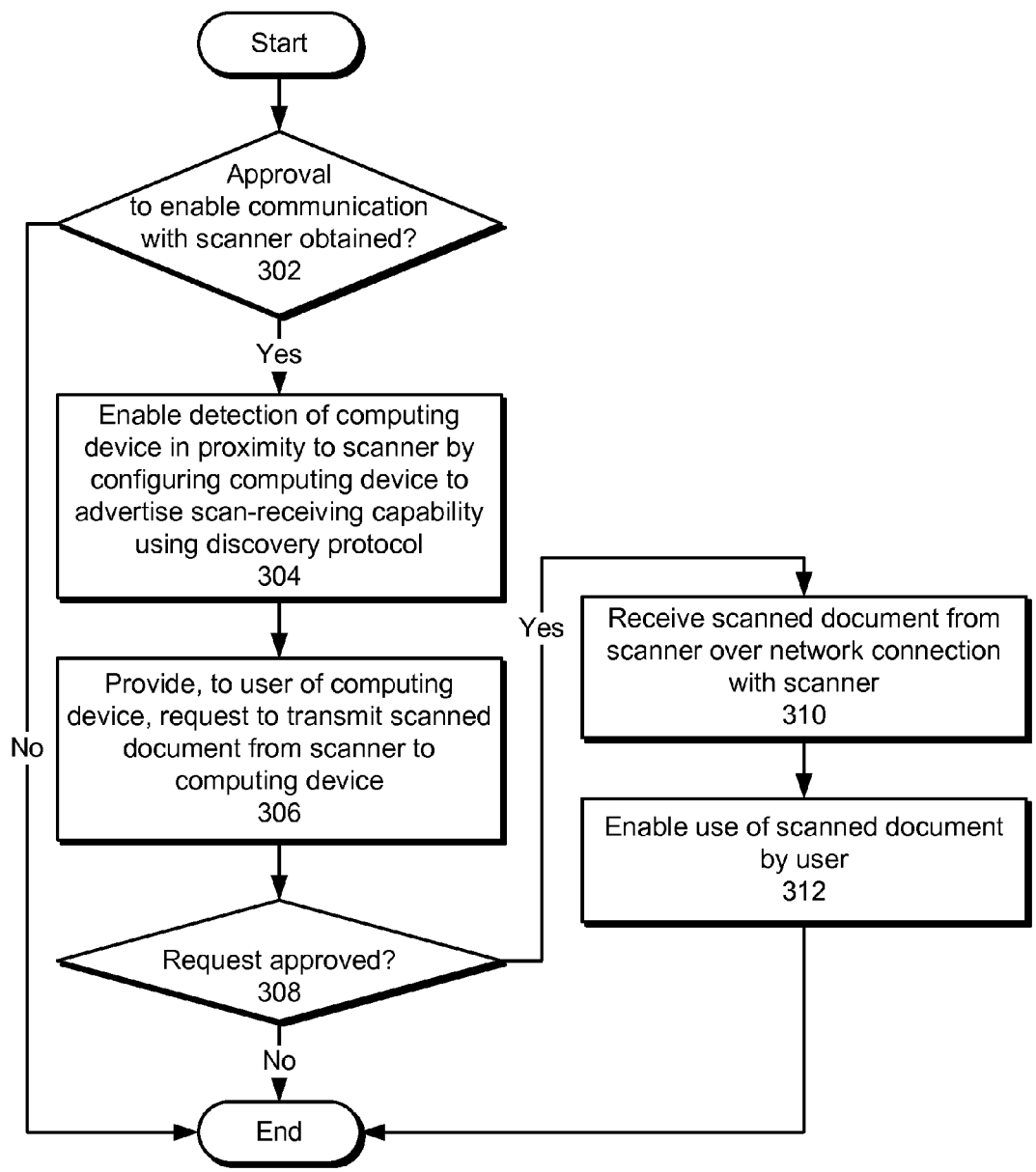
FIG. 3 shows a flowchart illustrating the process of obtaining a scanned document from a scanner in accordance with the disclosed embodiments.

FIG. 3 shows a flowchart illustrating the process of obtaining a scanned document from a scanner in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, approval to enable communication with the scanner may be obtained (operation 302) from a user of a computing device. If the user's approval is not obtained, the computing device is "hidden" from the scanner, and the scanned document is not transmitted from the scanner to the computing device. If the user's approval is obtained, detection of the computing device in proximity to the scanner is enabled by configuring the computing device to advertise a scan-receiving capability using a discovery protocol (operation 304) such as Bonjour.

While the computing device is discoverable, a request to transmit a scanned document from the scanner to the computing device is provided to the user (operation 306). For example, the request may be generated along with the scanned document by the scanner and sent to the computing device, where the request is shown within a GUI of the computing device. Alternatively, the request may be generated by the computing device if the scanned document has already been transmitted from the scanner to the computing device. Finally, the request may not be provided to the user if the user has configured the computing device to automatically accept all incoming scans from the scanner and/or other nearby scanners.

Transmission of the scanned document to the computing device may be based on approval of the request (operation 308) by the user. In addition, the request may include a query for an identifier associated with the computing device to validate the recipient of the scanned document. For example, the user may be asked to provide a valid PIN associated with transmission of the scanned document before the user is granted access to the scanned document.

If the request is not approved, the scanned document is not transmitted to the computing device. If the request is approved, the scanned document is received from the scanner over a network connection with the scanner (operation 310), and use of the scanned document by the user is enabled (operation 312). For example, the scanned document may be opened in a default application on the computing device, saved on the computing device, and/or forwarded from the computing device to a cloud-storage service and/or one or more other computing devices. Alternatively, if no default action is available for processing of the scanned document on the computing device, the user may be queried for an action associated with the document, and the action may be performed.

Figure 4:
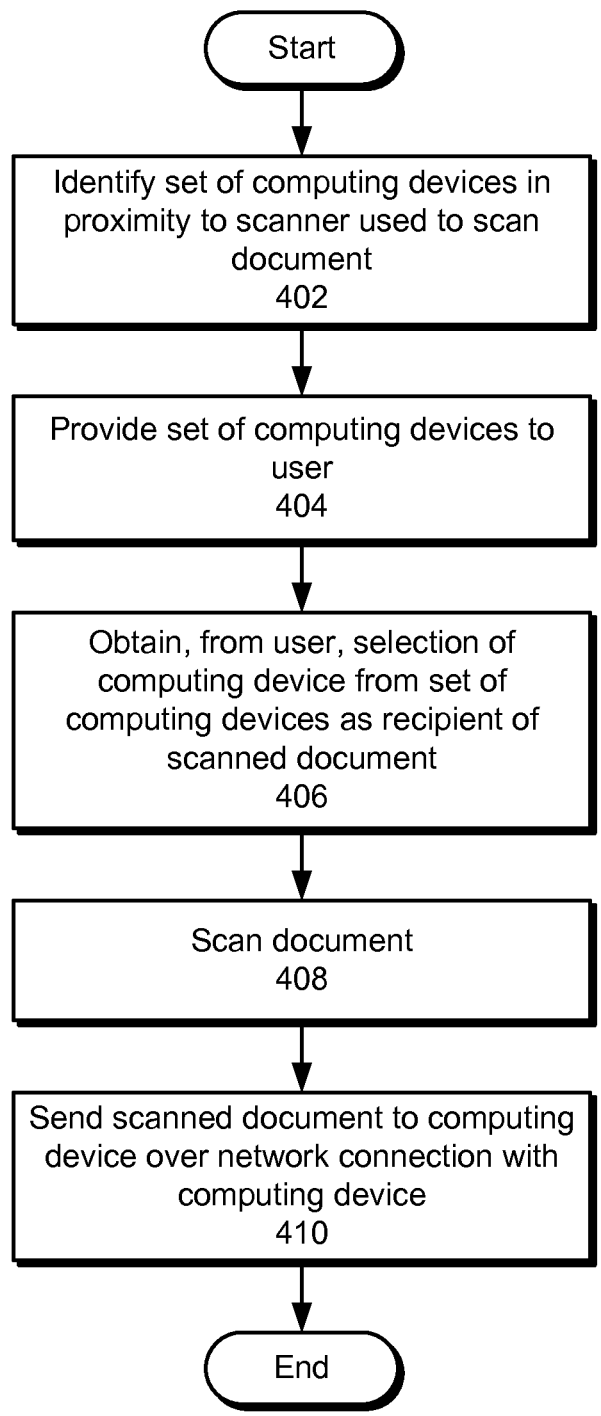
FIG. 4 shows a flowchart illustrating the process of performing document scanning in accordance with the disclosed embodiments.

FIG. 4 shows a flowchart illustrating the process of performing document scanning in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

First, a set of computing devices in proximity to a scanner used to scan the document is identified (operation 402). As described above, the computing devices may advertise a scan-receiving capability on a discovery protocol, thus enabling detection of the computing devices using the discovery protocol. The scanner may correspond to a multifunction printer and/or other electronic device capable of scanning documents, connecting to a network, and detecting nearby computing devices using the discovery protocol.

Next, the set of computing devices is provided to a user (operation 404) of the scanner, and a selection of a computing device from the set of computing devices as a recipient of the scanned document is obtained from the user (operation 406). For example, the computing devices may be displayed in a list to the user, and the user may select the computing device from the list. An identifier associated with the computing device may also be obtained during selection of the computing device. For example, the user may be asked to provide a PIN, password, and/or other alphanumeric input to the scanner. The identifier may be then used to guard against unwanted and/or unauthorized transmission of the scanned document. For example, the scanned document may not be sent from the scanner to the computing device unless a user of the computing device provides the same identifier on the computing device.

The document is then scanned (operation 408) and sent to the computing device over a network connection with the computing device (operation 410). For example, the network address of the computing device may be obtained using the discovery protocol, and the scanned document may be sent over a WiFi and/or Ethernet connection to the network address.

Figure 5:
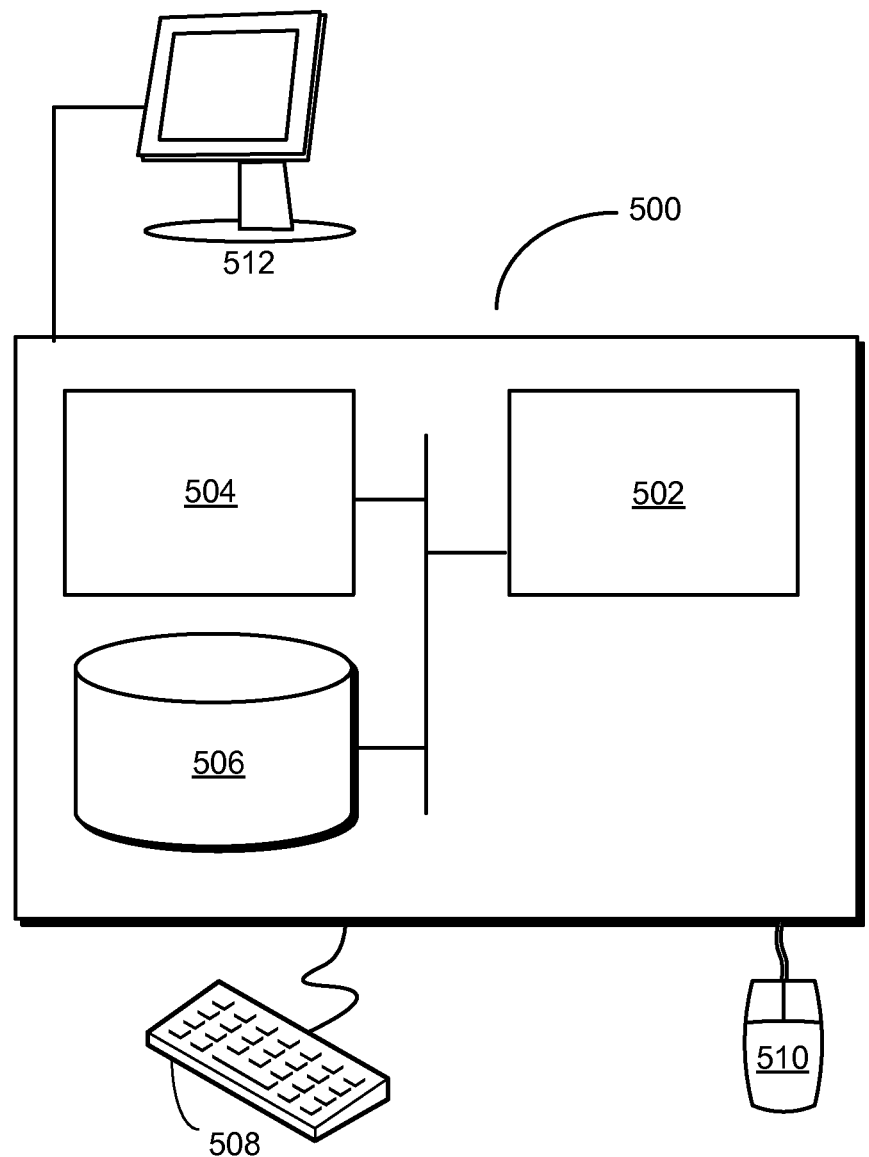
FIG. 5 shows a computer system in accordance with the disclosed embodiments.

FIG. 5 shows a computer system 500 in accordance with an embodiment. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for performing document scanning. The system may include a discovery apparatus that enables detection of a computing device in proximity to the scanner by configuring the computing device to advertise a scan-receiving capability using a discovery protocol. The system may also include a management apparatus that receives, at the computing device, a request from the scanner to transmit the scanned document to the computing device. If the request is approved by a user of the computing device, the management apparatus may receive the scanned document from the scanner over a network connection with the scanner. Finally, the management apparatus may enable use of the scanned document by the user. For example, the management apparatus may open the scanned document in a default application, save the scanned document, and/or forward the scanned document to a cloud-storage service and/or one or more other computing devices. Alternatively, if no default action is available for processing of the scanned document on the computing device, the management apparatus may query the user of the computing device for an action associated with the document.

In addition, one or more components of computer system 500 may be remotely located and connected to the other components over a network. Portions of the present embodiments (e.g., discovery apparatus, management apparatus, computing device, scanner, etc.) may also be located on different nodes of a distributed system that implements the embodiments. For example, the present embodiments may be implemented using a number of portable electronic devices and a number of scanners configured to perform document scanning for the portable electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method to enable ad-hoc communication with a scanner, comprising:

enabling, on a computing device, a direct scanner communication capability that is configured to cause the computing device to directly communicate with at least one scanner, wherein the direct scanner communication capability is enabled responsive to a scan setting from a user operating the computing device to indicate that the computing device is available to receive scanned documents;

configuring, in response to the enabling and via a zero-configuration networking protocol, the computing device to directly advertise its scan-receiving capability to one or more scanners in proximity to the computing device;

advertising, in response to the configuring, the scan-receiving capability of the computing device directly to the one or more scanners; and receiving, by the computing device, a scanned document directly from one of the one or more scanners over a network connection when the computing device corresponds to a recipient of the scanned document, wherein the enabling, the configuring, the advertising, and the receiving are performed without use of a server.

2. The computer-implemented method of claim 1, further comprising enabling use of the scanned document on the computing device.

3. The computer-implemented method of claim 2, wherein enabling use of the scanned document involves one or more of:
   opening the scanned document in a default application;
   saving the scanned document;
   forwarding the scanned document from the computing device to a cloud-storage service associated with a second user;
   forwarding the scanned document from the computing device to one or more other computing devices; and
   prompting for an action associated with the scanned document.

4. The computer-implemented method of claim 2, further comprising providing, by the computing device, a request to receive the scanned document from the scanner to the computing device, wherein use of the scanned document is enabled when the request is approved.

5. The computer-implemented method of claim 4, wherein the request comprises a query for an identifier associated with the computing device.

6. A computer-implemented method for performing document scanning, comprising:
   identifying, via a zero-configuration networking protocol, a set of computing devices in proximity to a scanner using a scan-receiving capability directly advertised by each computing device of the set of computing devices to the scanner;
   selecting, by the scanner and responsive to a user operation on the scanner, at least one computing device from the set of computing devices as a recipient of a scanned document, wherein the selection of the at least one computing device includes obtaining an identifier associated with the at least one computing device from the at least one computing device; and
   sending, via the zero-configuration networking protocol, the scanned document from the scanner directly to the selected at least one computing device over a network connection with the at least one computing device,
   wherein the identifying, the selecting, and the sending are performed without use of a server.

7. The computer-implemented method of claim 6, wherein the zero-configuration networking protocol is a discovery protocol to identify each computing device of the set of computing devices in proximity to the scanner.

8. The computer-implemented method of claim 6, wherein the network connection comprises a wireless network connection.

9. A non-transitory computer-readable storage medium storing instructions that when executed by a computer cause the computer to:
   enable, on a computing device, a direct scanner communication capability that is configured to cause the computing device to directly communicate with at least one scanner, wherein the direct scanner communication capability is enabled responsive to a scan setting from a user operating the computing device to indicate that the computing device is available to receive scanned documents;
   configure, in response to the enablement of the direct scanner communication capability and via a zero configuration networking protocol, the computing device to directly advertise its scan-receiving capability to one or more scanners in proximity to the computing device;
   advertise, in response to the configuring, the scan-receiving capability of the computing device directly to the one or more scanners; and
   receive, by the computing device, a scanned document directly from one of the one or more scanners over a network connection when the computing device corresponds to a recipient of the scanned document,
   wherein the enabling, the configuring, the advertising, and the receiving are performed without use of a server.

10. The non-transitory computer-readable storage medium of claim 9, further comprising instructions that when executed by a computer cause the computer to enable use of the scanned document on the computing device.

11. The non-transitory computer-readable storage medium of claim 10, wherein the instructions that when executed by a computer cause the computer to enable use of the scanned document on the computing device comprise instructions that when executed by computer cause the computer to do one or more of:
    open the scanned document in a default application on the computing device;
    save the scanned document on the computing device;
    forward the scanned document from the computing device to a cloud-storage service;
    forward the scanned document from the computing device to one or more other computing devices; and
    issue a prompt for an action associated with the scanned document.

12. The non-transitory computer-readable storage medium of claim 10, further comprising instructions that when executed by a computer cause the computer to provide a request to receive the scanned document from the scanner on the computing device, wherein use of the scanned document is enabled only if the request is approved.

13. A non-transitory program storage device comprising instructions stored thereon to cause one or more processors in a scanner to:
    identify, via a zero-configuration networking protocol, a set of computing devices in proximity to a scanner using a scan-receiving capability directly advertised by each computing device of the set of computing devices to the scanner;
    select, by the scanner and responsive to a user operation on the scanner, at least one computing device from the set of computing devices as a recipient of a scanned document, wherein the selection of the at least one computing device includes obtaining an identifier associated with the at least one computing device from the at least one computing device; and
    send, via a zero-configuration networking protocol, the scanned document from the scanner directly to the selected at least one computing device over a network connection with the at least one computing device,
    wherein the instructions to cause the one or more processors in the scanner to identify, select, and send comprise instructions to cause the one or more processors in the scanner to identify, select, and send without use of a server.

14. The non-transitory program storage device of claim 13, wherein the zero-configuration networking protocol is a discovery protocol to identify each computing device of the set of computing devices in proximity to the scanner.

15. The non-transitory program storage device of claim 13, wherein the network connection comprises a wireless network connection.

\* \* \* \* \*

UNITED STATES PATENT AND TRADEMARK OFFICE
CERTIFICATE OF CORRECTION

PATENT NO. : 10,129,417 B2
APPLICATION NO. : 13/364224
DATED : November 13, 2018
INVENTOR(S) : Michael R. Sweet et al.

Page 1 of 1

It is certified that error appears in the above-identified patent and that said Letters Patent is hereby corrected as shown below:

In the Claims

Claim 11 at Column 10, Line 21 should read -- instructions that when executed by the computer cause the --

Signed and Sealed this
First Day of January, 2019

Andrei Iancu
*Director of the United States Patent and Trademark Office*